US007161895B1

United States Patent
Sudo

(10) Patent No.: US 7,161,895 B1
(45) Date of Patent: Jan. 9, 2007

(54) OFDM-CDMA COMMUNICATION TERMINAL APPARATUS AND METHOD

(75) Inventor: Hiroaki Sudo, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 531 days.

(21) Appl. No.: 09/613,527

(22) Filed: Jul. 10, 2000

(30) Foreign Application Priority Data

Jul. 13, 1999 (JP) .................................. 11-198943

(51) Int. Cl.
H04J 9/00 (2006.01)
H04J 13/02 (2006.01)
H04J 1/00 (2006.01)
H04B 7/216 (2006.01)

(52) U.S. Cl. ...................... 370/204; 370/335; 370/342; 370/441; 370/479; 370/480

(58) Field of Classification Search ........ 370/203–206, 370/210, 212–215, 295, 342, 343–345, 441, 370/479–480; 375/242, 243, 326; 455/110, 455/112, 114.3, 127.2
See application file for complete search history.

(56) References Cited

U.S. PATENT DOCUMENTS

| 3,735,266 | A | * | 5/1973 | Amitay .................... 370/201 |
| 5,559,789 | A | * | 9/1996 | Nakano et al. ............. 370/342 |
| 5,757,766 | A | | 5/1998 | Sugita |
| 5,815,488 | A | * | 9/1998 | Williams et al. ............ 370/206 |
| 5,822,359 | A | * | 10/1998 | Bruckert et al. ............ 370/342 |
| 5,867,527 | A | * | 2/1999 | Ziv et al. .................... 375/147 |
| 5,943,329 | A | | 8/1999 | Ohgoshi et al. |
| 6,067,292 | A | * | 5/2000 | Huang et al. ............... 370/342 |
| 6,097,711 | A | * | 8/2000 | Okawa et al. .............. 370/335 |
| 6,097,715 | A | * | 8/2000 | Ichihara .................... 370/342 |
| 6,141,332 | A | * | 10/2000 | Lavean ...................... 370/335 |
| 6,175,558 | B1 | * | 1/2001 | Miya ......................... 370/335 |
| 6,198,731 | B1 | * | 3/2001 | Hamada et al. ............ 370/335 |
| 6,219,391 | B1 | | 4/2001 | Nakano |

(Continued)

FOREIGN PATENT DOCUMENTS

JP 07226710 8/1995

(Continued)

OTHER PUBLICATIONS

H. Matsutani et al., "Multi-Carrier DS-CDMA using Frequency Spread Coding," Technical Report of IEICE, RCS98-159 (Nov. 1998), pp. 49-54, with English abstract.

(Continued)

Primary Examiner—Seema S. Rao
Assistant Examiner—Gregory B. Sefcheck
(74) Attorney, Agent, or Firm—Stevens, Davis, Miller & Mosher, LLP

(57) ABSTRACT

An OFDM-CDMA transmission apparatus may include a first spreader that carries out spreading processing on a plurality of transmission signals using different spreading codes, respectively. A second spreader carries out spreading processing on at least one known signal using a spreading code different from the spreading codes employed by the first spreader. A frequency division multiplexer breaks down the transmission signals spread by the first spreader and the known signal spread by the second spreader into individual chips and subjects these chips to frequency division multiplexing, thereby assigning one chip data signal string per subcarrier. The frequency division multiplexer operates such that information from each of the plurality of transmission signals and the known signal is multiplexed into every chip assigned to a different subcarrier. After the chips are assigned to the subcarriers, they are transmitted by a transmitter.

7 Claims, 8 Drawing Sheets

U.S. PATENT DOCUMENTS

| | | | |
|---|---|---|---|
| 6,282,185 B1* | 8/2001 | Hakkinen et al. | 370/342 |
| 6,359,938 B1* | 3/2002 | Keevill et al. | 375/316 |
| 6,366,607 B1* | 4/2002 | Ozluturk et al. | 375/152 |
| 6,381,233 B1* | 4/2002 | Sunaga | 370/335 |
| 6,442,152 B1* | 8/2002 | Park et al. | 370/341 |
| 6,456,608 B1* | 9/2002 | Lomp | 370/335 |
| 6,519,244 B1* | 2/2003 | Unno | 370/342 |
| 6,542,485 B1* | 4/2003 | Mujtaba | 370/335 |
| 6,831,905 B1* | 12/2004 | Lomp et al. | 370/335 |
| 6,839,335 B1* | 1/2005 | Sudo | 370/335 |
| 6,975,668 B1* | 12/2005 | Zhang | 375/140 |
| 2004/0071078 A1* | 4/2004 | Sudo | 370/208 |
| 2005/0089085 A1* | 4/2005 | Sudo | 375/144 |
| 2005/0163082 A1* | 7/2005 | Sudo | 370/335 |
| 2006/0160498 A1* | 7/2006 | Sudo | 455/103 |

FOREIGN PATENT DOCUMENTS

| | | |
|---|---|---|
| JP | 8331095 | 12/1996 |
| JP | 983484 | 3/1997 |
| JP | 10262028 | 9/1998 |
| JP | 1168698 | 3/1999 |
| KR | 9876494 | 11/1998 |

OTHER PUBLICATIONS

H. Harada, et al.; "A New Multi-carrier CDMA/TDD Transmission Scheme Based on Cyclic Extended Spread Code for 4th Generation Mobile Communication System," Personal Wireless Communications, 1997 IEEE International Conference on Mumbai, India Dec. 17-19, 1997, New York, NY, USA, IEEE, US, Dec. 17, 1997, pp. 319-323, XP010268070, ISBN: 0-7803-4298-4.

Viterbi A. J.: "Principles of Spread Spectrum Communication, Multipath Propagation; Signal Structure and Exploitation," CDMA: Principles of Spread Spectrum Communication, XX, XX, pp. 84-92, XP002235877.

T. Luciano, et al.: "Effect of Carrier Phase Noise and Frequency Offset on the Performance of Multicarrier CDMA Systems," 1996 IEEE International Conference on Communications (ICC), Converging Technologies for Tomorrow's Applications, Dallas, Jun. 23-27, 1996, IEEE International Conference on Communications (ICC), New York, IEEE, US, vol. 3, Jun. 23, 1996, pp. 1513-1517, XP000625062, ISBN: 0-7803-3251-2.

H. Matsutani et al., "Multi-Carrier DS-CDMA using Frequency Spread Coding," Technical Report of IEICE, RCS98-159 (Nov. 1998), pp. 49-54, with Partial English translation.

European Office Action dated Sep. 6, 2004.

L. Tomba, et al. "Downlink Detection Schemes for MC-CDMA Systems in Indoor Environment" IEICE Transactions on Communication No. 9, Sep. 1, 1996, Tokyo, JP.

B. Farhang-Boroujeny "Pilot-based channel identification: Proposal for semi-binding identification of communication channels" Electronics Letters, vol. 31, No. 13, Jun. 22, 1995, IEE Stevenage GB.

Korean Office Action dated Apr. 22, 2002.

English translation of Korean Office Action. (Relevant Portion).

Japanese Office Action dated Mar. 8, 2005 with English translation.

* cited by examiner

OFDM-CDMA COMMUNICATION TERMINAL APPARATUS AND METHOD

BACKGROUND OF THE INVENTION

1. Field of the Invention

The present invention relates to a communication apparatus, and more particularly, to a communication apparatus that carries out radio communications combining a CDMA (Code Division Multiple Access) system and OFDM (Orthogonal Frequency Division Multiplexing) system in mobile communications.

2. Description of the Related Art

An error rate characteristic in a communication based on a CDMA system deteriorates in a multi-path environment because of interference between spreading codes. On the other hand, a well-known communication system resistant to interference between codes is an OFDM communication that uses a guard interval. Thus, a radio communication based on an OFDM-CDMA system that implements a CDMA-based communication with multiple carriers and performs transmission with subcarriers assigned to their respective chips then subjected to frequency division multiplexing is now a focus of attention as a next-generation radio communication system.

In an OFDM-CDMA-based communication, a plurality of signals is spread using mutually not correlated spreading codes by assigning one spread signal to one subcarrier. If these spreading codes are completely orthogonal to each other, signals other than the necessary ones are completely removed through despreading processing at the time of reception regardless of the degree of signal multiplexing.

Hereinafter, a conventional OFDM-CDMA-based communication apparatus will be explained using FIG. 1. FIG. 1 is a block diagram showing a configuration of a conventional OFDM-CDMA-based communication apparatus.

In the transmission system shown in FIG. 1, each spreading section 11 carries out spreading processing by multiplying transmission signals 1 to n by their respective spreading codes 1 to n. Here, suppose their spreading factor is k.

Addition section 12 adds up the transmission signals subjected to spreading processing. Serial/parallel (hereinafter referred to as "S/P") converter 13 converts a serial signal to a plurality of parallel signals. This S/P converter 13 divides the transmission signals thus spread and added up by spread signal or breaks down spread transmission signals 1 to n by spread signal (chip), that is, A 1st to kth chip.

IFFT processing section 14 carries out inverse Fourier transform processing on a plurality of parallel signals. This IFFT processing section 14 assigns one subcarrier to one chip data signal string and carries out frequency division multiplexing.

That is, the number of subcarriers corresponds to the spreading factor and it is "k" in this case. Suppose the 1st chip of transmission signals 1 to n is placed in subcarrier 1 and the kth chip of transmission signals 1 to n is placed in subcarrier k. That is, a chip data string is subjected to frequency division multiplexing. FIG. 2 shows this mode. Antenna 15 transmits/receives a radio signal.

In the reception system, quasi-coherent detection section 16 carries out quasi-coherent detection processing on the reception signal from antenna 15. That is, quasi-coherent detection section 16 carries out quasi-coherent detection processing under the control of a local signal subjected to frequency offset correction from frequency offset correction section 17, which will be described later. In this way, frequency offset correction is performed.

Frequency offset correction section 17 detects a frequency offset using the signal after quasi-coherent detection processing and creates a local signal based on this frequency offset. That is, frequency offset correction section 17 outputs the local signal subjected to frequency offset correction to quasi-coherent detection section 16.

FFT processing section 18 carries out Fourier transform processing on the reception signal subjected to quasi-coherent detection processing and extracts each subcarrier signal (chip data signal string). Transmission path compensation sections 19 are provided in one-to-one correspondence with subcarriers and carry out compensation processing such as phase compensation on their respective subcarrier reception signals.

Parallel/serial (hereinafter referred to as "P/S") converter 20 converts a plurality of parallel signals into a single serial signal. This P/S converter 20 rearranges the subcarrier signals from one chip to another and outputs the 1st chip of a signal on which spread transmission signals 1 to n are multiplexed at time $t_1$, the 2nd chip of a signal on which spread transmission signals 1 to n are multiplexed at time $t_2$, . . . up to the kth chip of a signal on which spread transmission signals 1 to n are multiplexed at time $t_k$.

Despreading sections 21 carry out despreading processing by multiplying the reception signal which has been converted to a single serial signal by their respective spreading codes 1 to n and extracting only the signals spread using those codes.

However, the above OFDM-CDMA-based communication apparatus has problems as shown below. That is, if the frequency offset detected by frequency offset correction section 17 above contains a detection error, the reception signal after FFT processing contains a residual phase error.

This results in the reception signal after FFT processing involving phase rotation. For example, as shown in FIG. 3, if the frequency offset contains a detection error of $\Delta f$, the 1st chip to kth chip corresponding to 2nd transmission signals 1 to n contain a residual phase error with $2\pi \Delta fT$. The 1st chip to kth chip corresponding to 3rd transmission signals 1 to n contain a residual phase error with $2\pi \Delta f2T$. Here, T is signal transmission speed before spreading processing.

Thus, the reception signals obtained from those signals containing residual phase errors have a deteriorated error rate characteristic.

SUMMARY OF THE INVENTION

It is an object of the present invention to provide an OFDM-CDMA-based communication apparatus capable of compensating residual phase errors.

This object is achieved by a transmission system and reception system carrying out processing as shown below. That is, first, the transmission system carries out spreading processing on a known signal provided apart from each transmission signal using a spreading code assigned to this known signal and inserts each spread transmission signal and the spread known signal into each subcarrier. Then, the reception system detects a residual phase error using the received known signal obtained by despreading processing using the spreading code above and the known signal above and carries out compensation processing on each reception signal using the detected residual phase error.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

With reference now to the attached drawings, embodiments of the present invention will be explained in detail below.

Embodiment 1

Figure 1:
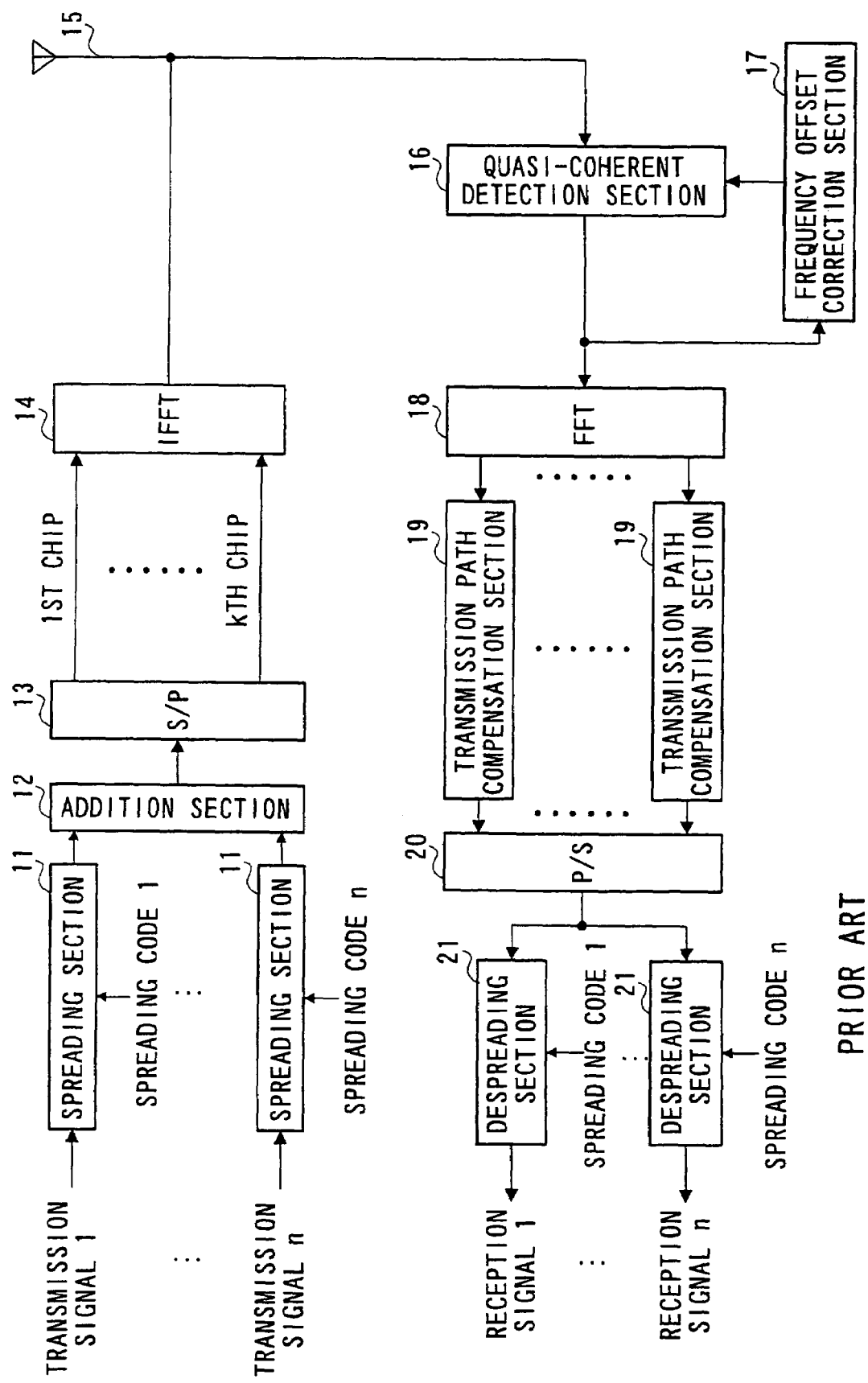
FIG. 1 is a block diagram showing a configuration of a conventional OFDM-CDMA-based communication apparatus.
Figure 2:
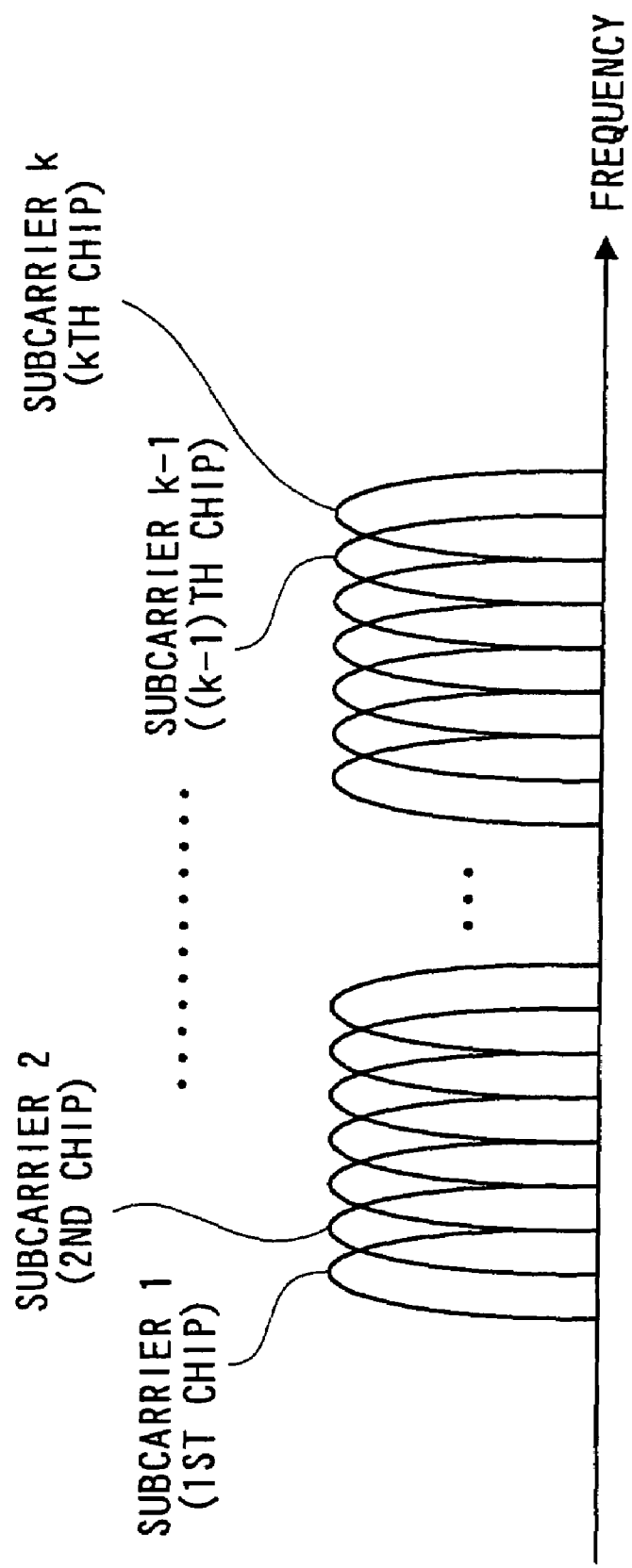
FIG. 2 is a schematic diagram showing an example of subcarrier placement of the conventional OFDM-CDMA-based communication apparatus.
Figure 3:
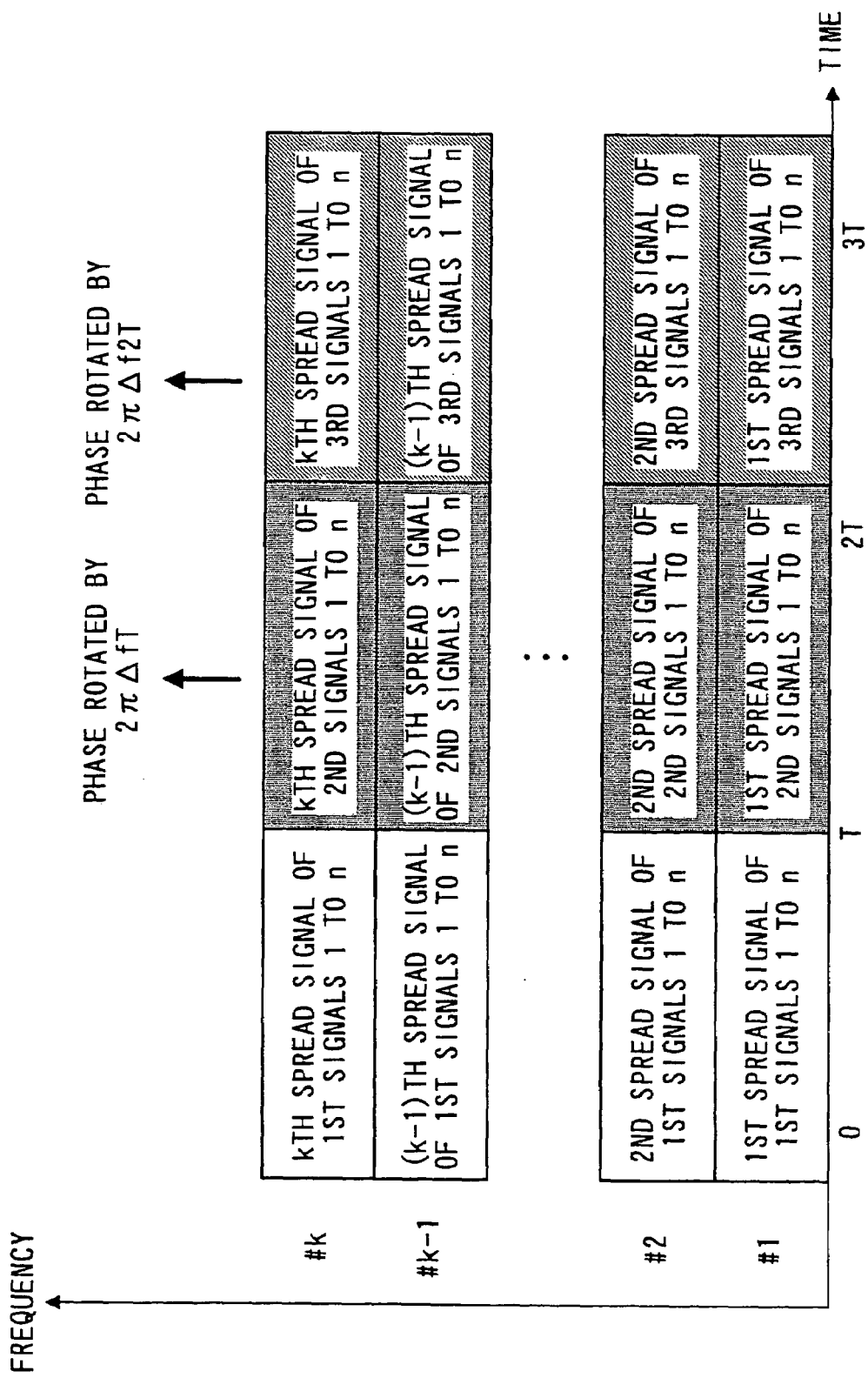
FIG. 3 is a schematic diagram showing an amount of phase rotation contained in a reception signal of the conventional OFDM-CDMA-based communication apparatus.
Figure 4:
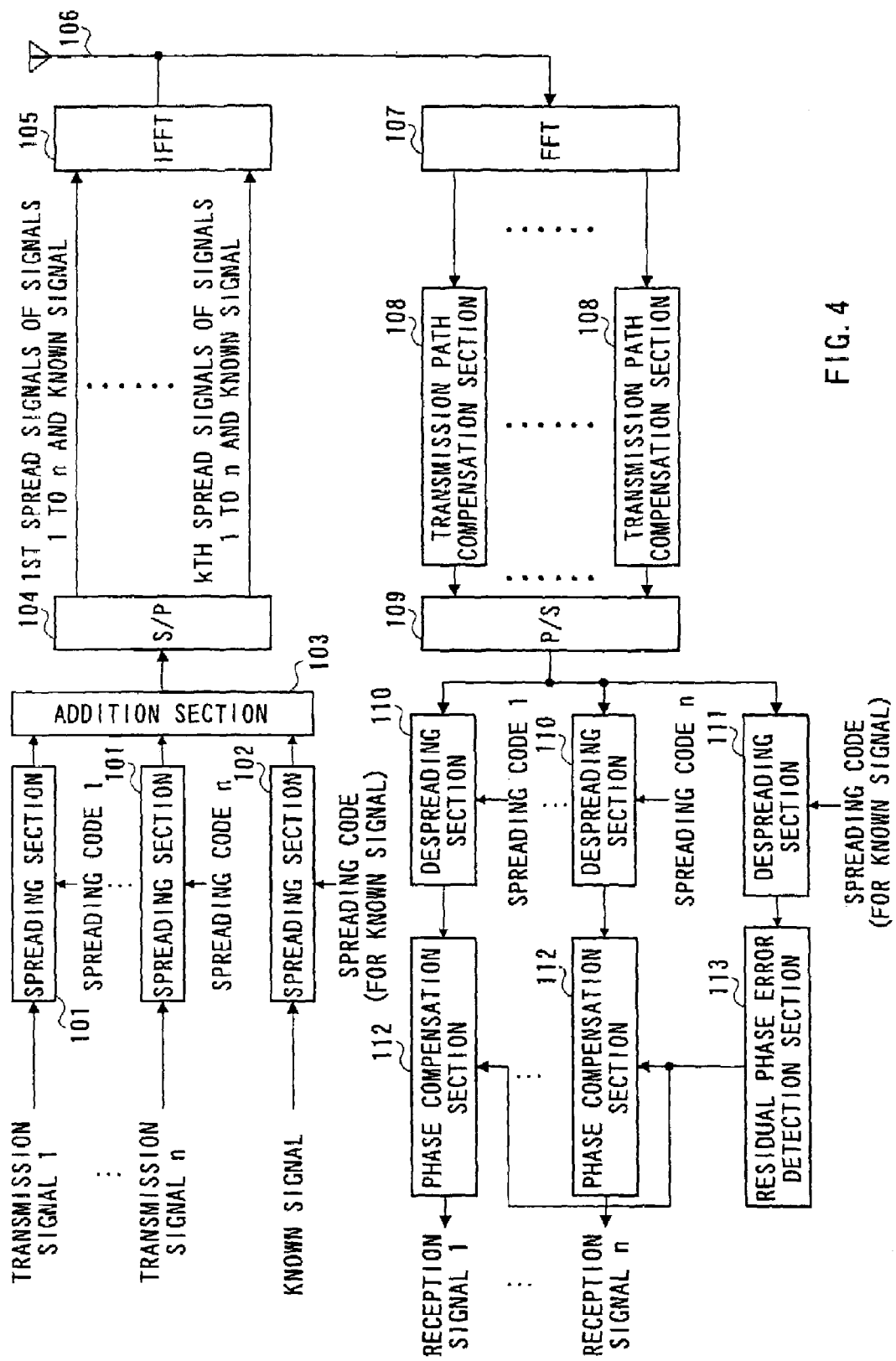
FIG. 4 is a block diagram showing a configuration of an OFDM-CDMA-based communication apparatus according to Embodiment 1 of the present invention.

FIG. 4 is a block diagram showing a configuration of an OFDM-CDMA-based communication apparatus according to Embodiment 1 of the present invention. In the transmission system shown in FIG. 4, each spreading section 101 carries out spreading processing by multiplying transmission signals 1 to n by their respective spreading codes 1 to n. Spreading section 102 carries out spreading processing by multiplying a known signal by a spreading code for the known signal. Here, suppose their spreading factor is k.

Addition section 103 multiplexes the transmission signals subjected to spreading processing by each spreading section and the known signal. S/P converter 104 divides the multiplexed and spread transmission signals and known signal by spread signal and breaks down spread transmission signals 1 to n and known signal by spread signal. That is, S/P converter 104 breaks down spread transmission signals 1 to n and known signal into a 1st chip to kth chip.

Figure 5:
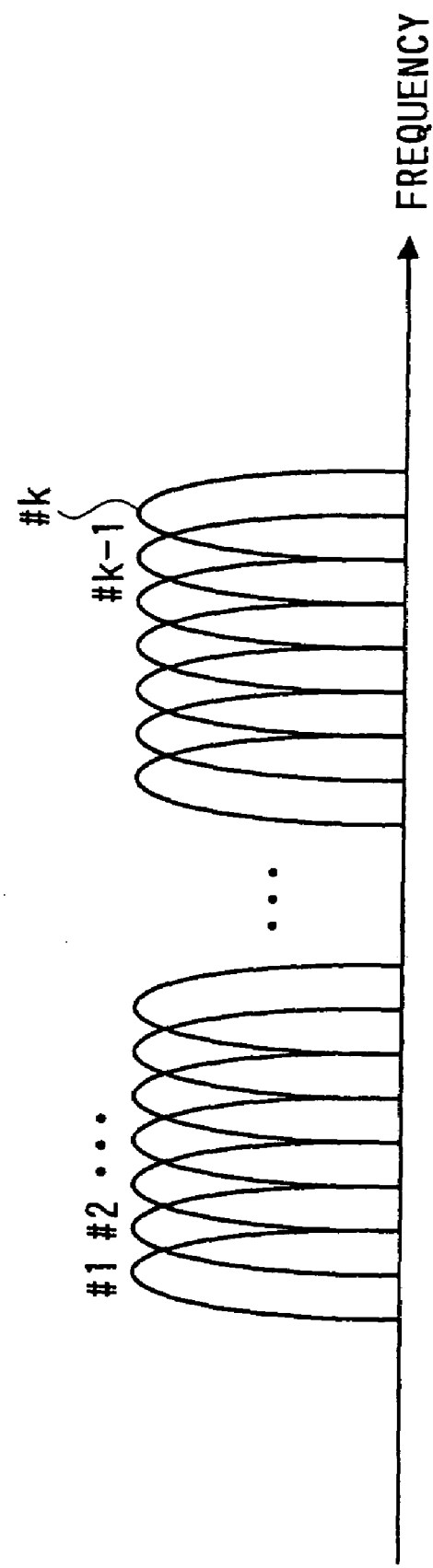
FIG. 5 is a schematic diagram showing an example of subcarrier placement of the OFDM-CDMA-based communication apparatus according to Embodiment 1 above.

IFFT processing section 105 carries out inverse Fourier transform processing on a plurality of parallel signals. Here, IFFT processing section 105 assigns one subcarrier (carrier) to one chip data signal string and carries out frequency division multiplexing. That is, the number of subcarriers corresponds to the spreading factor and it is k in this case. Suppose the 1st chip of transmission signals 1 to n is placed in subcarrier 1 and the kth chip of transmission signals 1 to n is placed in subcarrier k. In other words, IFFT processing section 105 subjects a chip data string to frequency division multiplexing. FIG. 5 shows this mode. Antenna 106 transmits/receives a radio signal.

In the reception system, FFT processing section 107 carries out Fourier transform processing on the reception signal from antenna 106 and extracts each subcarrier signal (chip data signal string). Here, the reception signal sent to FFT processing section 107 can also be the one subjected to frequency offset correction according to the above conventional system.

Each transmission path compensation section 108 is provided in one-to-one correspondence with subcarriers. Each transmission path compensation section 108 carries out compensation processing such as phase compensation on their respective subcarrier reception signals.

P/S converter 109 converts a plurality of parallel signals into a single serial signal. This P/S converter 109 rearranges subcarrier signals from one chip to another and outputs the first chip of a signal on which spread transmission signals 1 to n and the known signal are multiplexed at time $t_1$, the second chip of a signal on which spread transmission signals 1 to n and the known signal are multiplexed at time $t_2$, ... up to the kth chip of a signal on which spread transmission signals 1 to n and the known signal are multiplexed at time $t_k$.

Each despreading section 110 carries out despreading processing by multiplying the reception signal which has been converted to a single serial signal by their respective spreading codes 1 to n and extracting only the signals spread by those codes. Despreading section 111 carries out despreading processing by multiplying the reception signal which has been converted to a single serial signal by a known signal spreading code and extracting only the known signal spread by this code.

Figure 6:
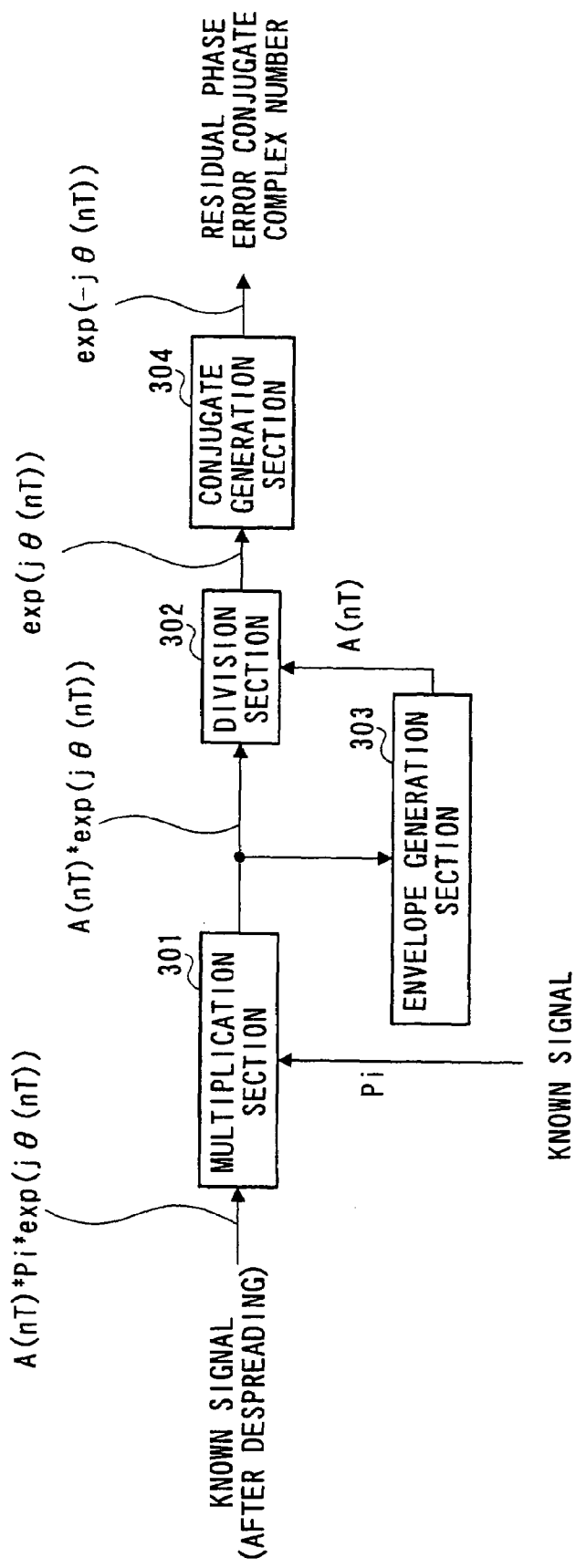
FIG. 6 is a block diagram showing a configuration of a residual phase error detection section of the OFDM-CDMA-based communication apparatus according to Embodiment 1 above.

Residual phase error detection section 113 detects a residual phase error using the known signal, that is, the same known signal used in the transmission system and the despread signal (received known signal) from the despreading section 111. Here, the method of detecting a residual phase error by residual phase error detection section 113 will be explained using FIG. 6. FIG. 6 is a block diagram showing a configuration of the residual phase error detection section of the OFDM-CDMA-based communication apparatus according to Embodiment 1 of the present invention.

Here, suppose residual phase error $\theta(nT)$ exists in the despread signal. In this case, despread signal RX(nT) is expressed in the following expression:

$$RX(nT) = TX(nT)\exp(j\theta(nT)) \qquad (1)$$

where TX(nT) is transmission signal n (n=1, 2, 3, ... ).

Furthermore, if residual phase error $\theta(nT)$ exists, despread known signal RXPi(nT), that is, the signal from despreading section 111 is expressed in the following expression.

$$RXPi(nT) = A(nT)Pi(nT)\exp(j\theta(nT)) \qquad (2)$$

where A(nT) is reception amplitude information of the known signal and Pi(nT) is the known signal.

In FIG. 6, multiplication section 301 multiplies despread known signal RXPi(nT) shown in expression ② by known signal Pi(nT). In this way, the signal output by multiplication section 301 is expressed in the following expression. Here, suppose |RXPi(nT)|=1.

$$A(nT)Pi(nT)\exp(j\theta(nT))Pi(nT) = A(nT)RXPi(nT)^2\exp(j\theta(nT)) = A(nT)\exp(j\theta(nT)) \qquad (3)$$

Then, division section 302 normalizes the signal from multiplication section 301, that is, the signal shown in expression ③ using the reception amplitude information A(nT) from envelope generation section 303. In this way, from division section 302 a residual phase error expressed in the following expression is detected.

$$A(nT)\exp(j\theta(nT))/A(nT)=\exp(j\theta(nT)) \quad (4)$$

Furthermore, conjugate generation section 304 generates a conjugate complex number of the signal from division section 302, that is, the signal shown in expression ④. In this way, conjugate complex number of the residual phase error $\exp(-j\theta(nT))$ is created. This is how the residual phase error detection section 113 detects a residual phase error.

Figure 7:
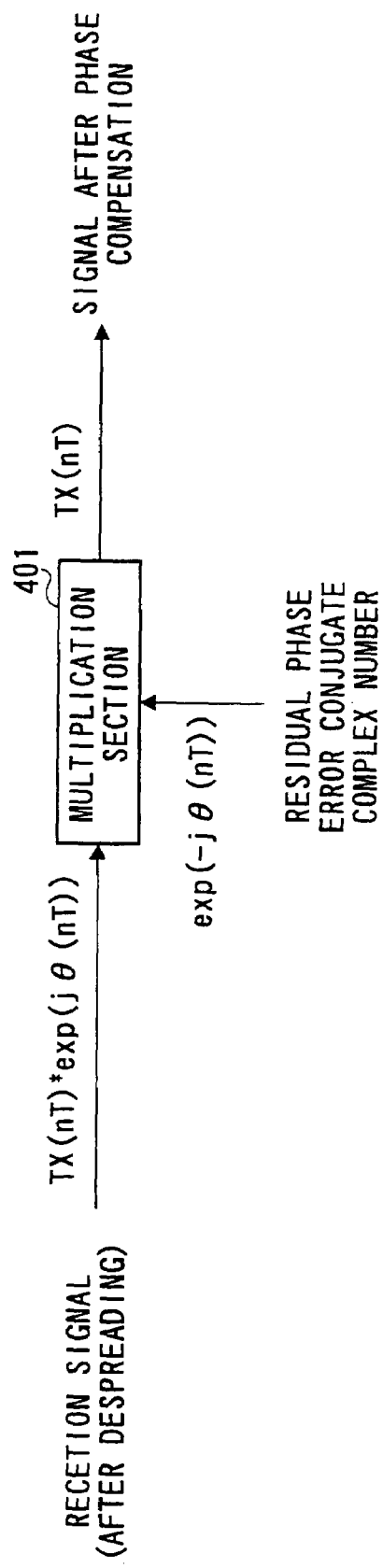
FIG. 7 is a block diagram showing a configuration of a phase compensation section of the OFDM-CDMA-based communication apparatus according to Embodiment 1 above.

In FIG. 4, residual phase error detection section 113 outputs the conjugate complex number of the detected residual phase error to each of phase compensation sections 112. Each phase compensation section 112 compensates the residual phase error for the despread reception signals from despreading sections 110 using the above conjugate complex numbers of the above residual phase errors. Here, the method of compensating a residual phase error by phase compensation sections 112 will be explained using FIG. 7. FIG. 7 is a block diagram showing a configuration of a phase compensation section of the OFDM-CDMA-based communication apparatus according to Embodiment 1 of the present invention.

As shown in FIG. 7, multiplication section 401 multiplies reception signal RX(nT) subjected to despreading processing by the conjugate complex number of residual phase error $\exp(-j\theta(nT))$. This allows multiplication section 401 to produce a reception signal with its residual phase error compensated as shown in the following expression:

$$RX(nT)=TX(nT)\exp(j\theta(nT))\exp(-j\theta(nT))=TX(nT) \quad (5)$$

That is, phase compensation sections 112 output signals quasi-equivalent to the transmission signals in the transmission system as reception signals with a residual phase error compensated. This is how compensation sections 112 compensate a residual phase error.

As shown above, according to this embodiment, the transmission system carries out spreading processing on a known signal provided apart from each transmission signal using a spreading code assigned to this known signal and inserts the despread known signal and each despread transmission signal into each subcarrier, while the reception system detects a residual phase error using the above known signal and received known signal obtained through the despreading processing using the above spreading code and carries out compensation processing using the detected residual phase error on the reception signal obtained through despreading processing using each spreading code, thus allowing a reception signal with an optimal error rate characteristic to be extracted. Thus, this embodiment can provide an OFDM-CDMA-based communication apparatus capable of compensating a residual phase error.

This embodiment describes the case where the transmission system uses one known reference signal, but the present invention is not limited to this and is also applicable to cases where the transmission system uses two or more known reference signals. In such cases, the reception system averages detected residual phase errors using each known reference signal, thus further improving the accuracy in detecting residual phase errors.

Embodiment 2

Embodiment 2 is an improved version of Embodiment 1 with the transmission system having a known signal whose signal level is higher than the levels of other transmission signals and the reception system with an improved signal-to-noise ratio when receiving the above known signal, thus improving the accuracy in detecting phase errors and preventing deterioration of the error rate characteristic of each reception signal. The OFDM-CDMA-based communication apparatus according to this embodiment will be explained using FIG. 8.

Figure 8:
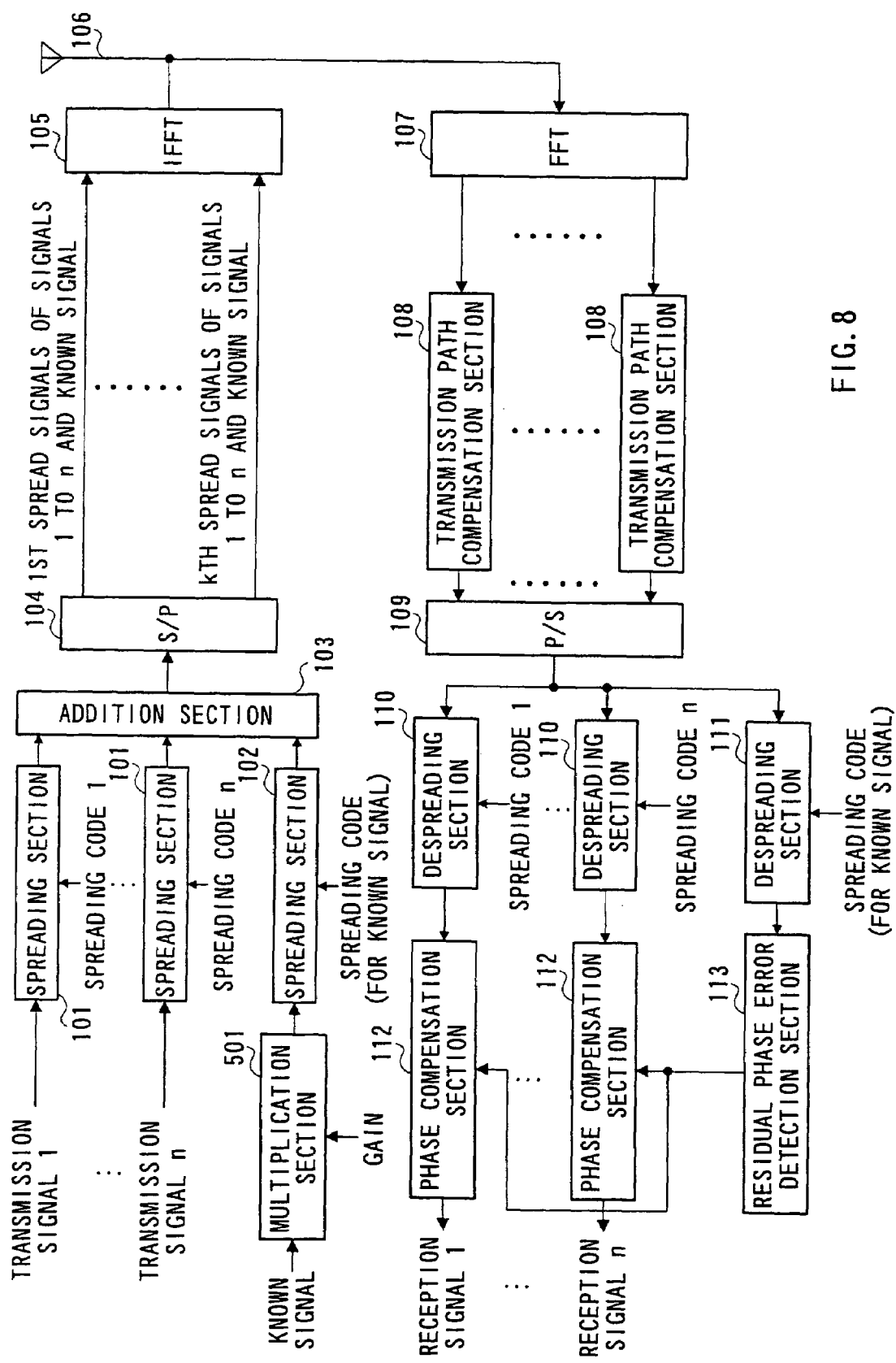
FIG. 8 is a block diagram showing a configuration of an OFDM-CDMA-based communication apparatus according to Embodiment 2 of the present invention.

FIG. 8 is a block diagram showing a configuration of the OFDM-CDMA-based communication apparatus according to Embodiment 2 of the present invention. The parts with the same configuration as that in Embodiment 1 (FIG. 4) are assigned the same reference numerals and their explanations are omitted.

In FIG. 8, multiplication section 501 receives gain-related information and a known signal as inputs and outputs a signal obtained by multiplying this known signal by a factor indicating the above gain to spreading section 102. This allows the reception system to have an improved signal-to-noise ratio when receiving the above known signal, which improves the accuracy in detecting phase errors in residual phase error detection section 113. This makes it possible to further suppress deterioration of the error rate characteristic of each reception signal compared to Embodiment 1.

Thus, this embodiment can prevent the error rate characteristic of each reception signal from deteriorating in the reception system by having a known signal whose signal level is higher than the levels of other transmission signals in the transmission system.

When two or more known reference signals are used, it goes without saying that the transmission system raises the signal level of each known reference signal as shown above. This allows the accuracy in detecting residual phase errors to be further improved, making it possible to prevent the error rate characteristic of each reception signal from deteriorating in the reception system.

Multiplexing a spread known signal with data is also applicable to a direct spreading CDMA system, but when the reception signal level falls or when interference between codes is large, deterioration of the residual phase error detection characteristic is also large.

On the other hand, when multiplexing a spread known signal with data is applied to an OFDM-CDMA system, it is possible to obtain a high accuracy residual phase error detection characteristic even when the reception signal level falls or when interference between codes is large for the following reasons:

① Even if the reception level of a certain subcarrier falls, there are still other subcarriers whose reception level has not fallen, which allows a frequency diversity effect to be obtained.

② A guard interval prevents influences of interference between codes.

As described above, according to the present invention, the transmission system carries out spreading processing on a known signal provided apart from each transmission signal using a spreading code assigned to this known signal and inserts each transmission signal subjected to spreading processing and the known signal subjected to spreading processing into each subcarrier, and the reception system detects a residual phase error using the received known signal obtained through despreading processing using the above spreading code and the above known signal and carries out compensation processing on each reception signal using the detected residual phase error, thus providing an OFDM-CDMA-based communication apparatus capable of compensating residual phase errors.

The present invention is not limited to the above described embodiments, and various variations and modifications may be possible without departing from the scope of the present invention.

This application is based on the Japanese Patent Application No. HEI 11-198943 filed on Jul. 13, 1999, entire content of which is expressly incorporated by reference herein.

What is claimed is:

1. An OFDM-CDMA transmission apparatus comprising:
   a first spreader that carries out spreading processing on a plurality of transmission signals at a predetermined spreading factor using different spreading codes respectively;
   a second spreader that carries out spreading processing on a known signal at the same spreading factor as the first spreader using a spreading code that is different from said spreading codes;
   a frequency division multiplexer that breaks down the known signal after the spreading processing by the second spreader into individual chips and subjects the known signal chips to frequency division multiplexing by assigning said known signal chips to subcarriers aligned in a frequency axis direction, the number of said subcarriers matching said spreading factor, and subjects the transmission signals after the spreading processing by the first spreader to frequency division multiplexing by assigning said transmission signals to said subcarriers; and
   a transmitter that transmits the known signal chips simultaneously and transmits said known signal chips and the transmission signals assigned to the subcarriers by the frequency division multiplexer simultaneously.

2. The OFDM-CDMA transmission apparatus according to claim 1, wherein the known signal that is spreading processed by said second spreader has a higher signal level than the transmission signals.

3. An OFDM-CDMA reception apparatus comprising:
   a receiver that receives a signal in which:
      a plurality of transmission signals and a known signal are subjected to spreading processing at the same spreading factor using different spreading codes respectively;
      the known signal after the spreading processing is broken down into individual chips and the known signal chips are subjected to frequency division multiplexing and are assigned to subcarriers aligned in a frequency axis direction, the number of said subcarriers matching said spreading factor; and
      the transmission signals after the spreading processing are subjected to frequency division multiplexing and assigned to said subcarriers;
   a first demodulator that carries out despreading processing on the signal received by the receiver using a predetermined spreading code and extracts received versions of the signals;
   a second demodulator that carries out despreading processing on the signal received by the receiver using the spreading code assigned to the known signal and extracts a received version of the known signal which is broken down into individual chips, the known signal chips being transmitted simultaneously and being transmitted simultaneously with the transmission signals;
   a phase error detector that detects a residual phase error using the known signal and the received version of said known signal; and
   a phase compensator that carries out phase compensation on the received versions of the signals using the residual phase error.

4. A communication terminal apparatus equipped with an OFDM-CDMA transmission apparatus and an OFDM-CDMA reception apparatus, wherein:
   said OFDM-CDMA transmission apparatus comprises:
      a first spreader that carries out spreading processing on a plurality of transmission signals at a predetermined spreading factor using different spreading codes respectively;
      a second spreader that carries out spreading processing on a known signal at the same spreading factor as the first spreader using a spreading code that is different from said spreading codes;
      a frequency division multiplexer that breaks down the known signal after the spreading processing by the second spreader into individual chips and subjects the known signal chips to frequency division multiplexing by assigning said known signal chips to subcarriers aligned in a frequency axis direction, the number of said subcarriers matching said spreading factor, and subjects the transmission signals after the spreading processing by the first spreader to frequency division multiplexing by assigning said transmission signals to said subcarriers; and
      a transmitter that transmits the known signal chips simultaneously and transmits said known signal chips and the transmission signals assigned to the subcarriers by the frequency division multiplexer simultaneously; and
   said OFDM-CDMA reception apparatus comprises:
      a receiver that receives a signal in which:
         a plurality of transmission signals and a known signal are subjected to spreading processing at the same spreading factor using different spreading codes respectively;
         the known signal after the spreading processing is broken down into individual chips and the known signal chips are subjected to frequency division multiplexing and are assigned to subcarriers aligned in a frequency axis direction, the number of said subcarriers matching said spreading factor; and
         the transmission signals after the spreading processing are subjected to frequency division multiplexing and assigned to said subcarriers;
      a first demodulator that carries out despreading processing on the signal received by the receiver using a predetermined spreading code and extracts received versions of the signals;
      a second demodulator that carries out despreading processing on the signal received by the receiver using the spreading code assigned to the known signal and extracts a received version of the known signal which is broken down into individual chips, the known signal chips being transmitted simultaneously and being transmitted simultaneously with the transmission signals;

a phase error detector that detects a residual phase error using the known signal and the received version of said known signal; and a phase compensator that carries out phase compensation on the received versions of the signals using the residual phase error.

5. A base station apparatus equipped with an OFDM-CDMA transmission apparatus and an OFDM-CDMA reception apparatus, wherein:

said OFDM-CDMA transmission apparatus comprises:

a first spreader that carries out spreading processing on a plurality of transmission signals at a predetermined spreading factor using different spreading codes respectively;

a second spreader that carries out spreading processing on a known signal at the same spreading factor as the first spreader using a spreading code that is different from said spreading codes;

a frequency division multiplexer that breaks down the known signal after the spreading processing by the second spreader into individual chips and subjects the known signal chips to frequency division multiplexing by assigning said known signal chips to subcarriers aligned in a frequency axis direction, the number of said subcarriers matching said spreading factor, and subjects the transmission signals after the spreading processing by the first spreader to frequency division multiplexing by assigning said transmission signals to said subcarriers; and a transmitter that transmits the known signal chips simultaneously and transmits said known signal chips and the transmission signals assigned to the subcarriers by the frequency division multiplexer simultaneously; and said OFDM-CDMA reception apparatus comprises:

a receiver that receives a signal in which:

a plurality of transmission signals and a known signal are subjected to spreading processing at the same spreading factor using different spreading codes respectively;

the known signal after the spreading processing is broken down into individual chips and the known signal chips are subjected to frequency division multiplexing and assigned to subcarriers aligned in a frequency axis direction, the number of said subcarriers matching said spreading factor; and the transmission signals after the spreading processing are subjected to frequency division multiplexing and assigned to said subcarriers;

a first demodulator that carries out despreading processing on the signal received by the receiver using a predetermined spreading code and extracts received versions of the signals;

a second demodulator that carries out despreading processing on the signal received by the receiver using the spreading code assigned to the known signal and extracts a received version of the known signal which is broken down into individual chips, the known signal chips being transmitted simultaneously and being transmitted simultaneously with the transmission signals;

a phase error detector that detects a residual phase error using the known signal and the received version of said known signal; and a phase compensator that carries out phase compensation on the received versions of the signals using the residual phase error.

6. A transmission method comprising:

a first spreading step of carrying out spreading processing on a plurality of transmission signals at a predetermined spreading factor using different spreading codes respectively;

a second spreading step of carrying out spreading processing on a known signal at the same spreading factor as in the first spreading step using a spreading code that is different from said spreading codes;

a frequency division multiplexing step of breaking down the known signal after the spreading processing in the second spreading step into individual chips and subjecting the known signal chips to frequency division multiplexing by assigning said known signal chips to subcarriers aligned in a frequency axis direction, the number of said subcarriers matching said spreading factor, and subjecting the transmission signals after the spreading processing in the first spreading step to frequency division multiplexing by assigning said transmission signals to said subcarriers; and a transmission step of transmitting the known signal chips simultaneously and transmitting said known signal chips and the transmission signals assigned to the subcarriers in the frequency division multiplexing step simultaneously.

7. A reception method comprising:

a reception step of receiving a signal in which:

a plurality of transmission signals and a known signal are subjected to spreading processing at the same spreading factor using different spreading codes respectively;

the known signal after the spreading processing is broken down into individual chips and the known signal chips are subjected to frequency division multiplexing and assigned to subcarriers aligned in a frequency axis direction, the number of said subcarriers matching said spreading factor; and the transmission signals after the spreading processing are subjected to frequency division multiplexing and assigned to said subcarriers;

a demodulation step of carrying out despreading processing on the signal received in the reception step using the spreading code assigned to the known signal and extracting a received version of the known signal which is broken down into individual chips, the known signal chips being transmitted simultaneously and being transmitted simultaneously with the transmission signals;

a phase error detection step of detecting a residual phase error using the known signal and the received version of said known signal; and a phase error compensation step of carrying out phase compensation on the received versions of the signals using the residual phase error.

* * * * *